June 14, 1938.  C. STERN  2,120,770
DRIFTING VALVE FOR LOCOMOTIVES
Filed July 24, 1934   2 Sheets-Sheet 1
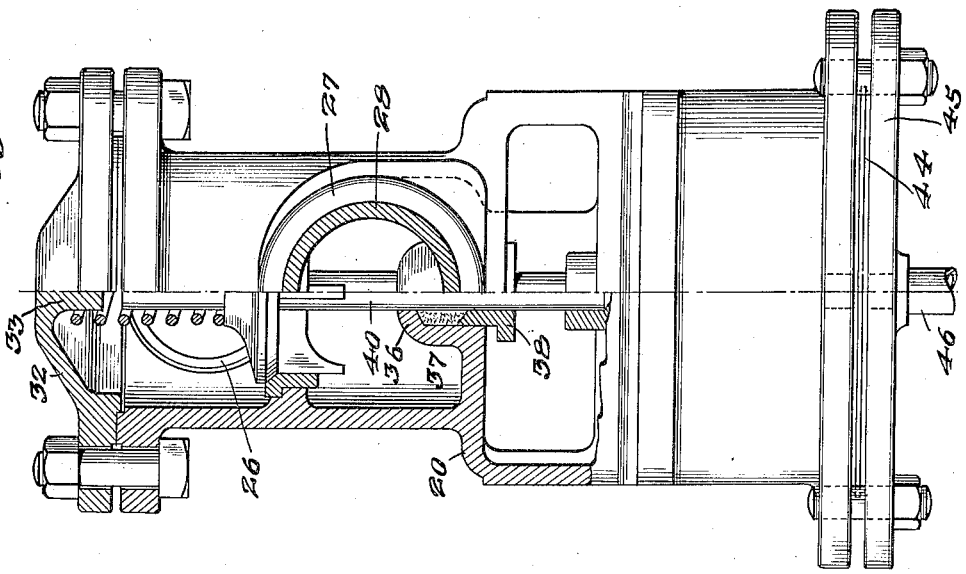
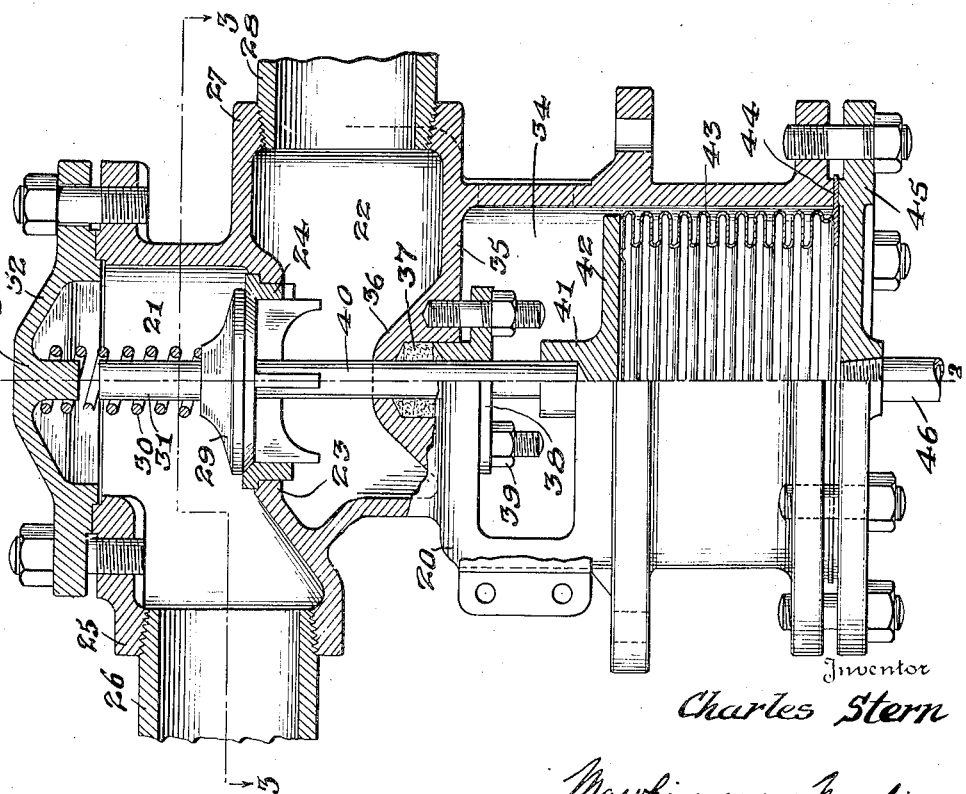
Inventor
Charles Stern
By Mawhinney & Mawhinney
Attorneys June 14, 1938.                    C. STERN                    2,120,770
                    DRIFTING VALVE FOR LOCOMOTIVES
                        Filed July 24, 1934                2 Sheets-Sheet 2
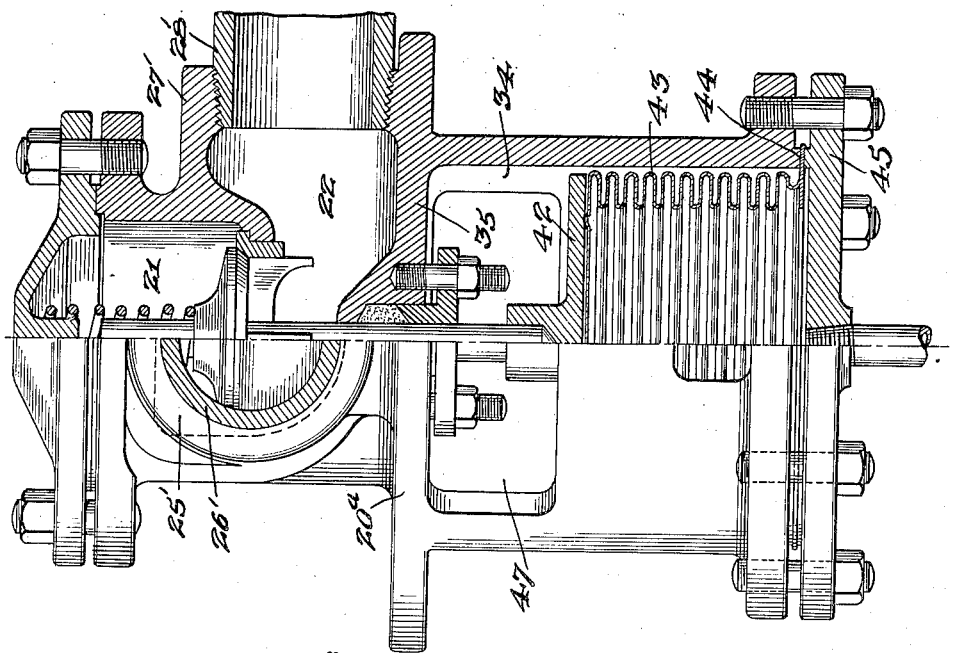
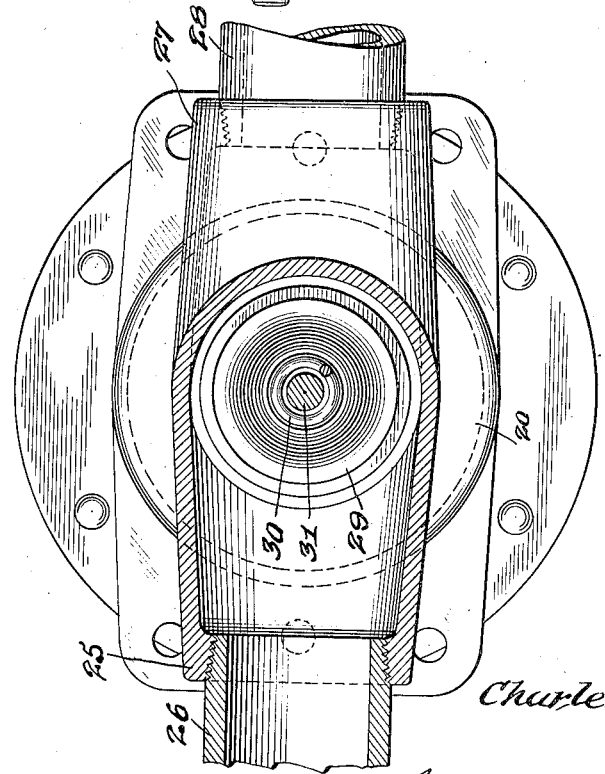
Inventor
Charles Stern
By Mawhinney & Mawhinney
Attorneys Patented June 14, 1938

2,120,770

UNITED STATES PATENT OFFICE 2,120,770

DRIFTING VALVE FOR LOCOMOTIVES

Charles Stern, Jersey City, N. J., assignor to Ardco Manufacturing Company, Hoboken, N. J., a corporation of Delaware Application July 24, 1934, Serial No. 736,751

1 Claim. (Cl. 137—153)

The present invention relates to improvements in drifting valves for locomotives and the like, and has for an object to provide a valve of simplified construction wherein the valve casing for the valve proper and the operating means for the valve is in one-piece to insure rigidity and alinement of the parts and which is so constructed that assembling and manufacturing of the parts are rendered more easy and economical.

This application constitutes a continuation-in-part of my prior applications Serial No. 635,445, filed September 29, 1932 and Serial No. 672,340, filed May 20, 1933.

Another object of this invention is to provide a compact and simplified valve structure which is dependable in operation, cannot easily get out of order and access to the various parts of which is relatively easy.

The invention also has for an object to provide an improved form of drifting valve in which the valve will open and close reliably and quickly in response to its actuating medium, which may be compressed air or the like.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a vertical section, partly in elevation, of a drifting valve embodying the features of the present invention.

Figure 2 is a vertical section through the same taken axially at right angles on the line 2—2 of the showing in Figure 1, and showing the lower portion in elevation.

Figure 3 is a transverse section taken through the upper part of the valve substantially on the line 3—3 of Figure 1, and Figure 4 is a vertical section taken through a slightly modified form of the valve wherein the controlled fluid connections are disposed axially at right angles to each other.

Referring now to the form of the invention shown in Figures 1, 2 and 3, the valve is provided with a one-piece or integral casing 20 which houses not only the valve but also its operating parts and provides a compact rigid structure maintaining the parts in true alinement and facilitating the mounting of the valve at various points of vantage on a locomotive or the like.

The upper part of the casing 20 is divided into opposed chambers 21 and 22 by a horizontal partition 23. The partition 23 has an opening or port therethrough with a marginal seat or bushing 24 of appropriate material, for instance non-rust or chromium plated substance. The opening in the partition 23 is co-axial with the casing 20 and the upper compartment 21 is provided at one side with an internally threaded coupling nipple 25 for receiving a pipe 26 through which steam or the like may pass, and the other compartment 22 is provided with an internally threaded coupling nipple 27 with which is connected a second steam pipe 28. Preferably, steam enters the pipe 26 and passes downwardly through the opening in the partition 23 to the chamber or compartment 22 and outwardly through the pipe 28.

A valve 29 of suitable construction is mounted in the bushing 24 to control the opening through the partition 23 and is normally urged downwardly to seat on the bushing 24 by a spring 30 which is disposed about a short stem 31 rising from the valve 29. The valve casing 20 has a removable cap 32 on its upper end which is provided with a spring seating stud 33 or the like for receiving and holding the upper end of the spring 30, the stud 33 being normally spaced from the short stem 31 a distance sufficient to admit the desired rise of the valve 29 when opened.

The pressure of the steam entering the upper chamber 21 thus tends to close the valve 29, the spring 30 aiding in this seating of the valve with the pressure of the steam. The pipes 26 and 28 may be connected to any suitable fluid system such as disclosed in the applications hereinabove referred to while it is apparent that the valve may be incorporated in other fluid pipe lines or systems to perform various desired functions of a pressure controlled valve. The lower compartment or chamber 22 in the casing 20 is separated from a bottom or operating compartment 34 provided in the casing 20, by a horizontal partition 35 which is preferably enlarged at its intermediate portion to provide a stuffing box 36 in which a packing 37 may be disposed and held compressed by a packing or gland nut 38 which is forced up into the stuffing box 36 against the packing 37 by nuts 39 with their threaded bolts secured in the lower side of the partition 35, as shown to advantage in Figure 1. The valve 29 is provided with a main stem 40 which extends downwardly through the stuffing box 36 and the partition 35 and which is sealed through the partition 35 by the packing 37 engaging about the stem 40. The lower end of the valve stem 40 is seated in a socket 41 carried axially upon an operating plate 42 which is disposed for reciprocating lengthwise in the lower operating chamber 34.

A bellows 43 is disposed beneath the plate 42 and has an attaching flange 44 at its lower end which extends outwardly against the lower edge portion of the casing 20 and which is clamped and sealed thereagainst by means of a bottom head 45 bolted or otherwise suitably secured to the lower end of the casing 20. The upper end of the bellows 43 engages flat against the lower side of a plate 42 so that as the bellows 43 expands the plate 42 is forced upwardly to raise the valve 29 from its seat 24. The lower head 45 closes not only the lower end of the operating chamber 34, but also seals and closes the bottom of the bellows 43. A fluid pressure pipe 46, for compressed air or the like, is connected through the lower head 45 and opens to the interior of the bellows 43 so that when it is desired to open the valve 29, fluid under pressure is admitted through pipe 46 to the bellows for expanding the same against the tension not only of the spring 30 in the top of the casing, but also against any fluid pressure which may be maintained in the upper chamber 21.

In the modification shown in Figure 4, the casing 20ᵃ is of the same form as shown in the other figures with the exception that the steam inlet pipe 26' is connected to the upper chamber 21 by an internally threaded nipple 25' disposed axially at right angles to the nipple 27' which opens into the lower chamber 22 and to which a pipe 28' is connected.

Of course these attaching nipples 25' and 27' may be disposed at various axially or other angularly related positions for adapting the valve to the particular installation in which it is to be used.

In all forms of the invention the casing 20 has a rigid and integral lower end portion which houses the operating chamber 34, and the chamber 34 may have immediately beneath the partition 35 any desired number of openings or slots 47 for the purpose of venting the chamber 34 above the operating plate 42. These openings 47 may also admit free access to the nuts 39 and their bolts to maintain the packing 37 in proper compressed position about the valve stem 40.

What is claimed is:—

A drifting valve, comprising an integral one piece casing having an intermediate horizontal wall therein providing upper and lower chambers, a second horizontal partition in said upper chamber providing opposed fluid compartments, a spring pressed valve mounted for guiding movement through the second partition for controlling communication between the fluid compartments, the lower chamber having an interior smooth bearing wall, an expansible bellows mounted coaxial with said valve and for vertical guiding movement in the lower chamber and having an outstanding ring on its lower end and a head on its upper end, a cap plate clamped on the lower end of the casing, said bellows ring engaging between the lower end of the casing and said cap plate for anchoring the bellows at its lower end, a stem slidably sealed through said first horizontal wall and engaging said valve at its upper end, a plate slidable in said lower chamber and engaging against the inner side of said bellows head, a socket carried by said plate, said stem being loosely and removably seated at its lower end in said socket and disposed coaxially with the valve and the bellows to transmit movement therebetween, and means carried in said cap plate for admitting fluid under pressure to the bellows for expanding the same and opening the valve.

CHARLES STERN.